(12) United States Patent
Plante

(10) Patent No.: US 8,880,279 B2
(45) Date of Patent: Nov. 4, 2014

(54) MEMORY MANAGEMENT IN EVENT RECORDING SYSTEMS

(71) Applicant: Smart Drive Systems, Inc., San Diego, CA (US)

(72) Inventor: James Plante, San Diego, CA (US)

(73) Assignee: Smart Drive Systems, Inc., San Diego, CA (US)

( * ) Notice: Subject to any disclaimer, the term of this patent is extended or adjusted under 35 U.S.C. 154(b) by 0 days.

(21) Appl. No.: 13/734,800

(22) Filed: Jan. 4, 2013

(65) Prior Publication Data

US 2014/0098228 A1   Apr. 10, 2014

Related U.S. Application Data

(63) Continuation of application No. 12/096,592, filed as application No. PCT/US2006/047055 on Dec. 7, 2006, now Pat. No. 8,374,746, which is a continuation of application No. 11/296,907, filed on Dec. 8, 2005, now abandoned.

(51) Int. Cl.
  *G06F 19/00* (2011.01)
  *G06F 7/00* (2006.01)
  (Continued)

(52) U.S. Cl.
  CPC ......... *H04N 7/183* (2013.01); *H04N 21/23406* (2013.01); *H04N 21/41422* (2013.01);
  (Continued)

(58) Field of Classification Search
  CPC ................... H04N 21/4223; H04N 21/42692; H04N 21/4334; H04N 21/44004
  USPC ................... 701/32.2, 33.3, 33.4; 711/147, 5; 345/545, 546, 547, 531–538; 710/56, 710/53; 375/372; 348/567, 231.1
  See application file for complete search history.

(56) References Cited

U.S. PATENT DOCUMENTS

| 673,203 A | 4/1901 | Freund |
|---|---|---|
| 673,795 A | 5/1901 | Hammer |

(Continued)

FOREIGN PATENT DOCUMENTS

| CA | 2469728 A1 | 12/2005 |
|---|---|---|
| CA | 2692415 A1 | 8/2011 |

(Continued)

OTHER PUBLICATIONS

Adaptec published and sold its VideoOh! DVD software USB 2.0 Edition in at least Jan. 24, 2003.

(Continued)

*Primary Examiner* — Khoi Tran
*Assistant Examiner* — Jorge Peche
(74) *Attorney, Agent, or Firm* — Pillsbury Winthrop Shaw Pittman LLP

(57) ABSTRACT

A vehicle event recorder is provided that includes a camera for capturing a video as discrete image frames, and that further includes a managed loop memory and a management system for generating a virtual 'timeline dilation' effect. To overcome size limits in the buffer memory of the video event recorder, the maximum time extension of a video series is increased by enabling a reduction in temporal resolution in exchange for an increase in the temporal extension. Memory cells are overwritten in an 'interleaved' fashion to produce a reduced frame rate for the recording of certain time periods connected to an event moment. In time periods furthest from the event moment, the resulting frame rate is minimized while in time periods closest to the event moment, the resulting frame rate is maximized.

12 Claims, 11 Drawing Sheets

(51) Int. Cl.

| | | |
|---|---|---|
| H04N 7/18 | (2006.01) | |
| H04N 21/234 | (2011.01) | |
| H04N 21/414 | (2011.01) | |
| H04N 21/4223 | (2011.01) | |
| H04N 21/426 | (2011.01) | |
| H04N 21/433 | (2011.01) | |
| H04N 21/44 | (2011.01) | |
| H04N 21/4402 | (2011.01) | |
| H04N 21/443 | (2011.01) | |
| H04N 5/77 | (2006.01) | |

(52) U.S. Cl.
CPC ..... *H04N 21/4223* (2013.01); *H04N 21/42692* (2013.01); *H04N 21/4334* (2013.01); *H04N 21/44004* (2013.01); *H04N 21/440281* (2013.01); *H04N 21/4435* (2013.01); *H04N 7/181* (2013.01); *H04N 5/77* (2013.01)
USPC .......... 701/32.2; 701/33.3; 701/33.4

(56) References Cited

U.S. PATENT DOCUMENTS

| | | | |
|---|---|---|---|
| 673,907 A | 5/1901 | Johnson | |
| 676,075 A | 6/1901 | McDougall | |
| 679,511 A | 7/1901 | Richards | |
| 681,036 A | 8/1901 | Burg | |
| 681,283 A | 8/1901 | Waynick | |
| 681,998 A | 9/1901 | Swift | |
| 683,155 A | 9/1901 | Thompson | |
| 683,214 A | 9/1901 | Mansfield | |
| 684,276 A | 10/1901 | Lonergan | |
| 685,082 A | 10/1901 | Wood | |
| 685,969 A | 11/1901 | Campbell | |
| 686,545 A | 11/1901 | Selph | |
| 689,849 A | 12/1901 | Brown | |
| 691,982 A | 1/1902 | Sturgis | |
| 692,834 A | 2/1902 | Davis | |
| 694,781 A | 3/1902 | Prinz | |
| 2,943,141 A | 6/1960 | Knight | |
| 3,634,866 A | 1/1972 | Meyer | |
| 3,781,824 A | 12/1973 | Caiati | |
| 3,812,287 A | 5/1974 | Lemelson | |
| 3,885,090 A | 5/1975 | Rosenbaum | |
| 3,992,656 A | 11/1976 | Joy | |
| 4,054,752 A | 10/1977 | Dennis | |
| 4,271,358 A | 6/1981 | Schwarz | |
| 4,276,609 A | 6/1981 | Patel | |
| 4,280,151 A | 7/1981 | Tsunekawa | |
| 4,281,354 A | 7/1981 | Conte | |
| 4,401,976 A | 8/1983 | Stadelmayr | |
| 4,409,670 A | 10/1983 | Herndon | |
| 4,420,773 A | 12/1983 | Toyoda | |
| 4,425,097 A | 1/1984 | Owens | |
| 4,456,931 A | 6/1984 | Toyoda | |
| 4,489,351 A | 12/1984 | d'Alayer de Costemore d'Arc | |
| 4,496,995 A | 1/1985 | Colles | |
| 4,500,868 A | 2/1985 | Tokitsu | |
| 4,528,547 A | 7/1985 | Rodney | |
| 4,533,962 A | 8/1985 | Decker | |
| 4,558,379 A | 12/1985 | Huetter | |
| 4,588,267 A | 5/1986 | Pastore | |
| 4,593,313 A | 6/1986 | Nagasaki | |
| 4,621,335 A | 11/1986 | Bluish | |
| 4,625,210 A | 11/1986 | Sagl | |
| 4,630,110 A | 12/1986 | Cotton | |
| 4,632,348 A | 12/1986 | Keesling | |
| 4,638,289 A | 1/1987 | Zottnik | |
| 4,646,241 A | 2/1987 | Ratchford | |
| 4,651,143 A | 3/1987 | Yamanaka | |
| 4,671,111 A | 6/1987 | Lemelson | |
| 4,718,685 A | 1/1988 | Kawabe | |
| 4,754,255 A | 6/1988 | Sanders | |
| 4,758,888 A | 7/1988 | Lapidot | |
| 4,763,745 A | 8/1988 | Eto | |
| 4,785,474 A | 11/1988 | Bernstein | |
| 4,789,904 A | 12/1988 | Peterson | |
| 4,794,566 A | 12/1988 | Richards | |
| 4,804,937 A | 2/1989 | Barbiaux | |
| 4,806,931 A | 2/1989 | Nelson | |
| 4,807,096 A | 2/1989 | Skogler | |
| 4,814,896 A | 3/1989 | Heitzman | |
| 4,837,628 A | 6/1989 | Sasaki | |
| 4,839,631 A | 6/1989 | Tsuji | |
| 4,843,463 A | 6/1989 | Michetti | |
| 4,843,578 A | 6/1989 | Wade | |
| 4,853,856 A | 8/1989 | Hanway | |
| 4,853,859 A | 8/1989 | Morita | |
| 4,866,616 A | 9/1989 | Takeuchi | |
| 4,876,597 A | 10/1989 | Roy | |
| 4,883,349 A | 11/1989 | Mittelhauser | |
| 4,896,855 A | 1/1990 | Furnish | |
| 4,926,331 A | 5/1990 | Windle | |
| 4,930,742 A | 6/1990 | Schofield | |
| 4,936,533 A | 6/1990 | Adams | |
| 4,939,652 A | 7/1990 | Steiner | |
| 4,942,464 A | 7/1990 | Milatz | |
| 4,945,244 A | 7/1990 | Castleman | |
| 4,949,186 A | 8/1990 | Peterson | |
| 4,980,913 A | 12/1990 | Skret | |
| 4,987,541 A | 1/1991 | Levente | |
| 4,992,943 A | 2/1991 | McCracken | |
| 5,012,335 A | 4/1991 | Cohodar | |
| 5,027,104 A | 6/1991 | Reid | |
| 5,046,007 A | 9/1991 | McCrery | |
| 5,050,166 A | 9/1991 | Cantoni | |
| 5,056,056 A | 10/1991 | Gustin | |
| 5,057,820 A | 10/1991 | Markson | |
| 5,096,287 A | 3/1992 | Kakinami | |
| 5,100,095 A | 3/1992 | Haan | |
| 5,111,289 A | 5/1992 | Lucas | |
| 5,140,434 A | 8/1992 | Van Blessinger | |
| 5,140,436 A | 8/1992 | Blessinger | |
| 5,140,438 A | 8/1992 | Kurahashi et al. | |
| 5,144,661 A | 9/1992 | Shamosh | |
| 5,178,448 A | 1/1993 | Adams | |
| 5,185,700 A | 2/1993 | Bezos | |
| 5,196,938 A | 3/1993 | Blessinger | |
| 5,223,844 A | 6/1993 | Mansell | |
| 5,224,211 A | 6/1993 | Roe | |
| 5,262,813 A | 11/1993 | Scharton | |
| 5,283,433 A * | 2/1994 | Tsien | 250/234 |
| 5,305,214 A | 4/1994 | Komatsu | |
| 5,305,216 A | 4/1994 | Okura | |
| 5,308,247 A | 5/1994 | Dyrdek | |
| 5,309,485 A | 5/1994 | Chao | |
| 5,311,197 A | 5/1994 | Sorden | |
| 5,321,753 A | 6/1994 | Gritton | |
| 5,327,288 A | 7/1994 | Wellington | |
| 5,330,149 A | 7/1994 | Haan | |
| 5,343,527 A | 8/1994 | Moore | |
| 5,353,023 A | 10/1994 | Mitsugi | |
| 5,361,326 A | 11/1994 | Aparicio | |
| 5,387,926 A | 2/1995 | Bellan | |
| 5,388,045 A | 2/1995 | Kamiya | |
| 5,388,208 A * | 2/1995 | Weingartner et al. | 345/544 |
| 5,404,330 A | 4/1995 | Lee | |
| 5,408,330 A | 4/1995 | Squicciarini | |
| 5,422,543 A | 6/1995 | Weinberg | |
| 5,430,431 A | 7/1995 | Nelson | |
| 5,430,432 A | 7/1995 | Camhi | |
| 5,435,184 A | 7/1995 | Pineroli | |
| 5,445,024 A | 8/1995 | Riley | |
| 5,445,027 A | 8/1995 | Zorner | |
| 5,446,659 A | 8/1995 | Yamawaki | |
| 5,455,625 A | 10/1995 | Englander | |
| 5,455,716 A | 10/1995 | Suman | |
| 5,465,079 A | 11/1995 | Bouchard | |
| 5,473,729 A | 12/1995 | Bryant | |
| 5,477,141 A | 12/1995 | Naether | |
| 5,495,242 A | 2/1996 | Kick | |
| 5,495,243 A | 2/1996 | McKenna | |
| 5,497,419 A | 3/1996 | Hill | |
| 5,499,182 A | 3/1996 | Ousborne | |

(56) References Cited

U.S. PATENT DOCUMENTS

| | | |
|---|---|---|
| 5,504,482 A | 4/1996 | Schreder |
| 5,513,011 A | 4/1996 | Matsumoto |
| 5,515,285 A | 5/1996 | Garrett |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,600,775 A | 2/1997 | King |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,712,679 A | 1/1998 | Coles |
| 5,717,456 A | 2/1998 | Rudt |
| 5,719,554 A | 2/1998 | Gagnon |
| 5,781,145 A | 7/1998 | Williams |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A * | 8/1998 | Tanaka et al. ............ 369/124.14 |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van Ryzin |
| 5,877,897 A | 3/1999 | Schofield |
| 5,896,167 A | 4/1999 | Omae |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | Ofarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,049,079 A | 4/2000 | Noordam |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,167,186 A | 12/2000 | Kawasaki |
| 6,181,373 B1 | 1/2001 | Coles |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,298,290 B1 | 10/2001 | Abe |
| 6,300,875 B1 | 10/2001 | Schafer |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,389,339 B1 | 5/2002 | Just |
| 6,389,340 B1 | 5/2002 | Rayner |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,493,650 B1 | 12/2002 | Rodgers |
| 6,505,106 B1 | 1/2003 | Lawrence |
| 6,507,838 B1 | 1/2003 | Syeda-Mahmood |
| 6,516,256 B1 | 2/2003 | Hartmann |

(56) References Cited

U.S. PATENT DOCUMENTS

| | | |
|---|---|---|
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt |
| 6,559,769 B2 | 5/2003 | Anthony |
| 6,575,902 B1 | 6/2003 | Burton |
| 6,580,983 B2 | 6/2003 | Laguer-Diaz |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,728,612 B1 | 4/2004 | Carver |
| 6,732,031 B1 | 5/2004 | Lightner |
| 6,732,032 B1 | 5/2004 | Lowrey |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley et al. |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,894,606 B2 | 5/2005 | Forbes |
| 6,895,248 B1 | 5/2005 | Akyol |
| 6,898,492 B2 | 5/2005 | De Leon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,265,663 B2 | 9/2007 | Steele |
| 7,272,179 B2 | 9/2007 | Siemens |
| 7,308,341 B2 | 12/2007 | Schofield |
| 7,317,974 B2 | 1/2008 | Luskin |
| 7,348,895 B2 | 3/2008 | Lagassey |
| 7,349,027 B2 * | 3/2008 | Endo et al. .................. 348/446 |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,457,693 B2 | 11/2008 | Olsen |
| 7,536,457 B2 | 5/2009 | Miller |
| 7,561,054 B2 | 7/2009 | Raz |
| 7,623,754 B1 | 11/2009 | McKain |
| 7,659,827 B2 | 2/2010 | Gunderson |
| 7,667,731 B2 | 2/2010 | Kreiner |
| 7,702,442 B2 | 4/2010 | Takenaka |
| 7,768,548 B2 | 8/2010 | Silvernail |
| 7,804,426 B2 | 9/2010 | Etcheson |
| 7,821,421 B2 | 10/2010 | Tamir |
| 7,853,376 B2 | 12/2010 | Peng |
| 7,974,748 B2 | 7/2011 | Goerick |
| 8,140,358 B1 | 3/2012 | Ling |
| 8,311,858 B2 | 11/2012 | Everett |
| 8,314,708 B2 | 11/2012 | Gunderson |
| 8,321,066 B2 | 11/2012 | Becker |
| 8,508,353 B2 | 8/2013 | Cook |
| 8,564,446 B2 | 10/2013 | Gunderson |
| 8,635,557 B2 | 1/2014 | Geise |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |

(56) References Cited

U.S. PATENT DOCUMENTS

| | | |
|---|---|---|
| 2003/0081934 A1 | 5/2003 | Kirmuss |
| 2003/0081935 A1 | 5/2003 | Kirmuss |
| 2003/0095688 A1* | 5/2003 | Kirmuss ............... 382/105 |
| 2003/0112133 A1 | 6/2003 | Webb |
| 2003/0125854 A1* | 7/2003 | Kawasaki et al. ............ 701/35 |
| 2003/0144775 A1 | 7/2003 | Klausner |
| 2003/0154009 A1* | 8/2003 | Basir et al. ............... 701/35 |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0214585 A1 | 11/2003 | Bakewell |
| 2003/0220835 A1* | 11/2003 | Barnes, Jr. ............... 705/14 |
| 2003/0222880 A1* | 12/2003 | Waterman ............... 345/531 |
| 2004/0008255 A1* | 1/2004 | Lewellen ............... 348/148 |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1* | 3/2004 | Bauer et al. ............... 701/33 |
| 2004/0044592 A1 | 3/2004 | Ubik |
| 2004/0054444 A1* | 3/2004 | Abeska et al. ............... 701/1 |
| 2004/0054513 A1 | 3/2004 | Laird |
| 2004/0054689 A1 | 3/2004 | Salmonsen |
| 2004/0070926 A1 | 4/2004 | Boykin |
| 2004/0083041 A1* | 4/2004 | Skeen et al. ............... 701/35 |
| 2004/0088090 A1* | 5/2004 | Wee ............... 701/35 |
| 2004/0103008 A1 | 5/2004 | Wahlbin |
| 2004/0103010 A1 | 5/2004 | Wahlbin |
| 2004/0111189 A1* | 6/2004 | Miyazawa et al. ............... 701/1 |
| 2004/0138794 A1* | 7/2004 | Saito et al. ............... 701/35 |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0209594 A1 | 10/2004 | Naboulsi |
| 2004/0210353 A1* | 10/2004 | Rice ............... 701/1 |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1* | 12/2004 | Hubbard et al. ............... 701/35 |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1* | 5/2005 | Lao et al. ............... 348/207.99 |
| 2005/0100329 A1* | 5/2005 | Lao et al. ............... 386/117 |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1* | 6/2005 | Barnes ............... 455/461 |
| 2005/0137757 A1 | 6/2005 | Phelan |
| 2005/0137796 A1* | 6/2005 | Gumpinger ............... 701/211 |
| 2005/0146458 A1 | 7/2005 | Carmichael |
| 2005/0149238 A1 | 7/2005 | Stefani |
| 2005/0159964 A1 | 7/2005 | Sonnenrein |
| 2005/0166258 A1 | 7/2005 | Vasilevsky |
| 2005/0171692 A1 | 8/2005 | Hamblen |
| 2005/0174217 A1* | 8/2005 | Basir et al. ............... 340/425.5 |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Holst |
| 2005/0200714 A1 | 9/2005 | Marchese |
| 2005/0203683 A1 | 9/2005 | Olsen |
| 2005/0206741 A1 | 9/2005 | Raber |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0258942 A1* | 11/2005 | Manasseh et al. ............ 340/425.5 |
| 2005/0264691 A1* | 12/2005 | Endo et al. ............... 348/446 |
| 2005/0283284 A1 | 12/2005 | Grenier |
| 2006/0001671 A1* | 1/2006 | Kamijo et al. ............... 345/531 |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1* | 2/2006 | Peng ............... 701/35 |
| 2006/0040239 A1 | 2/2006 | Cummins |
| 2006/0047380 A1* | 3/2006 | Welch ............... 701/29 |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0092043 A1* | 5/2006 | Lagassey ............... 340/907 |
| 2006/0095175 A1* | 5/2006 | deWaal et al. ............... 701/33 |
| 2006/0095199 A1* | 5/2006 | Lagassey ............... 701/117 |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0142913 A1 | 6/2006 | Coffee |
| 2006/0147187 A1* | 7/2006 | Takemoto et al. ............ 386/117 |
| 2006/0161960 A1 | 7/2006 | Benoit |
| 2006/0168271 A1 | 7/2006 | Pabari |
| 2006/0178793 A1 | 8/2006 | Hecklinger |
| 2006/0209840 A1 | 9/2006 | Paatela |
| 2006/0212195 A1 | 9/2006 | Veith |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1* | 11/2006 | Wu et al. ............... 701/35 |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0120948 A1 | 5/2007 | Fujioka |
| 2007/0124332 A1 | 5/2007 | Ballesty |
| 2007/0132773 A1* | 6/2007 | Plante ............... 345/564 |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1* | 6/2007 | Plante ............... 701/35 |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0216521 A1 | 9/2007 | Guensler |
| 2007/0219685 A1 | 9/2007 | Plante |
| 2007/0219686 A1 | 9/2007 | Plante |
| 2007/0241874 A1 | 10/2007 | Okpysh |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0268158 A1 | 11/2007 | Gunderson |
| 2007/0271105 A1 | 11/2007 | Gunderson |

(56) References Cited

U.S. PATENT DOCUMENTS

| | | |
|---|---|---|
| 2007/0273480 A1 | 11/2007 | Burkman |
| 2007/0279214 A1 | 12/2007 | Buehler |
| 2007/0299612 A1 | 12/2007 | Kimura |
| 2008/0059019 A1 | 3/2008 | Delia |
| 2008/0111666 A1 | 5/2008 | Plante |
| 2008/0143834 A1 | 6/2008 | Comeau |
| 2008/0147267 A1 | 6/2008 | Plante et al. |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0252485 A1 | 10/2008 | Lagassey |
| 2008/0269978 A1 | 10/2008 | Shirole |
| 2008/0281485 A1 | 11/2008 | Plante |
| 2008/0309762 A1 | 12/2008 | Howard et al. |
| 2009/0043971 A1* | 2/2009 | Kim .................. 711/150 |
| 2009/0216775 A1 | 8/2009 | Ratliff et al. |
| 2009/0224869 A1 | 9/2009 | Baker |
| 2009/0290848 A1* | 11/2009 | Brown .................. 386/52 |
| 2009/0299622 A1 | 12/2009 | Denaro |
| 2009/0312998 A1 | 12/2009 | Berckmans |
| 2009/0326796 A1 | 12/2009 | Prokhorov |
| 2010/0045451 A1 | 2/2010 | Periwal |
| 2010/0063672 A1 | 3/2010 | Anderson |
| 2010/0063850 A1 | 3/2010 | Daniel |
| 2010/0070175 A1 | 3/2010 | Soulchin |
| 2010/0085193 A1 | 4/2010 | Boss |
| 2010/0085430 A1 | 4/2010 | Kreiner |
| 2010/0087984 A1 | 4/2010 | Joseph |
| 2010/0153146 A1 | 6/2010 | Angell |
| 2010/0157061 A1 | 6/2010 | Katsman |
| 2010/0220892 A1 | 9/2010 | Kawakubo |
| 2010/0250021 A1 | 9/2010 | Cook |
| 2010/0268415 A1 | 10/2010 | Ishikawa |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0121960 A1 | 5/2011 | Tsai |
| 2011/0125365 A1 | 5/2011 | Larschan |
| 2011/0130916 A1 | 6/2011 | Mayer |
| 2011/0173015 A1 | 7/2011 | Chapman |
| 2011/0224891 A1 | 9/2011 | Iwuchukwu |
| 2011/0273568 A1 | 11/2011 | Lagassey |
| 2011/0283223 A1 | 11/2011 | Vaittinen et al. |
| 2011/0304446 A1 | 12/2011 | Basson |
| 2012/0035788 A1 | 2/2012 | Trepagnier |
| 2012/0046803 A1 | 2/2012 | Inou |
| 2012/0071140 A1 | 3/2012 | Oesterling |
| 2012/0100509 A1 | 4/2012 | Gunderson |
| 2013/0006469 A1 | 1/2013 | Green |
| 2013/0030660 A1 | 1/2013 | Fujimoto |
| 2013/0332004 A1 | 12/2013 | Gompert et al. |

FOREIGN PATENT DOCUMENTS

| | | |
|---|---|---|
| DE | 4416991 A1 | 11/1995 |
| DE | 20311262 | 9/2003 |
| DE | 202005008238 | 9/2005 |
| DE | 102004004669 A1 | 12/2005 |
| EP | 0708427 A2 | 4/1996 |
| EP | 0840270 A2 | 5/1998 |
| EP | 0848270 A2 | 5/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| GB | 2268608 A | 1/1994 |
| GB | 2402530 A | 12/2004 |
| GB | 2447184 B | 6/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | 5294188 | 11/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 A | 7/2002 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0028410 A1 | 5/2000 |
| WO | 0048033 | 8/2000 |
| WO | 0077620 | 12/2000 |
| WO | 0123214 | 4/2001 |
| WO | 0125054 | 4/2001 |
| WO | 0146710 A2 | 6/2001 |
| WO | 2006022824 A2 | 3/2006 |
| WO | 2011055743 A1 | 5/2011 |

OTHER PUBLICATIONS

Ambulance Companies Use Video Technology to Improve Driving Behavior, Ambulance Industry Journal, Spring 2003.

Amended Complaint for Patent Infringement, Trade Secret Misappropriation, Unfair Competition and Conversion in *DriveCam, Inc.* v. *SmartDrive Systems, Inc.*, Case No. 3:11-CV-00997-H-RBB, for the Southern District of California, Document 34, filed Oct. 20, 2011, pp. 1-15.

Amendment filed Dec. 23, 2009 during prosecution of U.S. Appl. No. 11/566,424.

Answer to Amended Complaint; Counterclaims; and Demand for Jury Trial in *DriveCam, Inc.* v. *SmartDrive Systems, Inc.*, Case No. 3:11-CV-00997 H (RBB), for the Southern District of California, Document 47, filed Dec. 13, 2011, pp. 1-15.

U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill, 'DriveCam—FAQ', Dec. 12, 2003.
Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/fiash/articles/vidtemplate_mediapreso_flash8.html.
David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8UNLEASHED (Sams Oct. 12, 2005).
Del Lisk, 'DriveCam Training Handout Ver4', Feb. 3, 2005.
Drivecam, Inc., User's Manual for Drivecam Video Systems' Hindsight 20/20 Software Version 4.0 (2003).

(56) References Cited

OTHER PUBLICATIONS

DriveCam, Inc.'s Infringement Contentions Exhibit A, U.S. Patent 6,389,340, Document 34.1, Oct. 20, 2011.
DriveCam, Inc.'s Infringement Contentions Exhibit B, U.S. Patent 7,659,827. Aug. 19, 2011.
DriveCam, Inc.'s Infringement Contentions Exhibit B, U.S. Patent 7,804,426, Document 34.2, Oct. 20, 2011.
DriveCam, Inc.'s Infringement Contentions Exhibit C, U.S. Patent 7,659,827, Document 34.3, Oct. 20, 2011.
DriveCam, Inc.'s Infringement Contentions Exhibit C, U.S. Patent 7,804,426. Aug. 19, 2011.
DriveCam, Inc.'s Infringement Contentions Exhibit D, Document 34.4, Oct. 20, 2011.
DriveCam—Illuminator Data Sheet, Oct. 2, 2004.
Drivecam.com as retrieved by the Internet Wayback Machine as of Mar. 5, 2005.
DriveCam's Disclosure of Asserted Claims and Preliminary Infringement Contentions in *DriveCam, Inc.* v. *SmartDrive Systems, Inc.*, Case No. 3:11-CV-00997-H-RBB, for the Southern District of California. Aug. 19, 2011.
DriveCam Driving Feedback System, Mar. 15, 2004.
DriveCam Extrinsic Evidence with Patent LR 4.1 .a Disclosures, Nov. 3, 2011.
DriveCam Extrinsic Evidence with Patent LR 4.1 .a Disclosures, Nov. 8, 2011.
Driver Feedback System, Jun. 12, 2001.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
GE published its VCR User's Guide for Model VG4255 in 1995.
Glenn Oster, 'Hindsight 20/20 v4.0 Software Installation', 1 of 2, Jun. 20, 2003.
Glenn Oster, 'HindSight 20/20 v4.0 Software Installation', 2 of 2, Jun. 20, 2003.
Glenn Oster, 'Illuminator Installation', Oct. 3, 2004.
Hans Fantel, Video; Search Methods Make a Difference in Picking VCR's, NY Times, Aug. 13, 1989.

I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorysub.--Code=coaching)., printed from site on Jan. 11, 2012.
Interior Camera Data Sheet, Oct. 26, 2001.
International Search Report and Written Opinion issued in PCT/US07/68325 on Feb. 27, 2008.
International Search Report and Written Opinion issued in PCT/US07/68328 on Oct. 15, 2007.
International Search Report and Written Opinion issued in PCT/US07/68329 on Mar. 3, 2008.
International Search Report and Written Opinion issued in PCT/US07/68332 on Mar. 3, 2008.
International Search Report and Written Opinion issued in PCT/US07/68334 on Mar. 5, 2008.
International Search Report for PCT/US2006/47055, Mailed Mar. 20, 2008 (2 pages).
International Search Report issued in PCT/US2006/47042 mailed Feb. 25, 2008.
J. Gallagher, 'Lancer Recommends Tech Tool', Insurance and Technology Magazine, Feb. 2002.
Jean (DriveCam vendor), 'Dc Data Sheet', Nov. 6, 2002.
Jean (DriveCam vendor), 'DriveCam brochure', Nov. 6, 2002.
Jean (DriveCam vendor), 'Feedback Data Sheet', Nov. 6, 2002.
Jean (DriveCam vendor), 'Hindsight 20-20 Data Sheet', Nov. 4, 2002.
Jessyca Wallace, 'Analyzing and Processing DriveCam Recorded Events', Oct. 6, 2003.
Jessyca Wallace, 'Overview of the DriveCam Program', Dec. 15, 2005.
Jessyca Wallace, 'The DriveCam Driver Feedback System', Apr. 6, 2004.
Joint Claim Construction Chart, U.S. Patent No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Patent No. 6,389,340, 'Vehicle Data Reporter' for Case No. 3:11-CV-00997-H-RBB, Document 44-1, filed Dec. 1, 2011, pp. 1-10.
Joint Claim Construction Worksheet, U.S. Patent No. 6,389,340, "Vehicle Data Reporter" for Case No. 3:11-CV-00997-H-RBB, Document 44-1, filed Dec. 1, 2011, pp. 1-10.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.* v. *SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004.
Julie Stevens, 'Program Support Roll-Out & Monitoring', Jul. 13, 2004.
Jung, Sang-Hack, et al., Egomotion Estimation in Monocular Infrared Image Sequence for Night Vision Applications, IEEE Workshop on Applications of Computer Vision (WACV '07), Feb. 2007, pp. 8-8; Digital Object Identifier 10.1109/WACV.2007.20.
JVC Company of America, JVC Video Cassette Recorder HR-IP820U Instructions (1996).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002.
Karen, 'Managers Guide to the DriveCam Driving Feedback System', Jul. 30, 2002.

(56) References Cited

OTHER PUBLICATIONS

Kathy Latus (Latus Design), 'Case Study—Cloud 9 Shuttle', Sep. 23, 2005.
Kathy Latus (Latus Design), 'Case Study—Lloyd Pest Control', Jul. 19, 2005.
Kathy Latus (Latus Design), 'Case Study—Time Warner Cable', Sep. 23, 2005.
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Non-Final Office Action for U.S. Appl. No. 11/296,907, Mailed Mar. 22, 2007 (17 pages).
Non-final Office Action mailed Aug. 27, 2009 during prosecution of U.S. Appl. No. 11/566,424.
Non-Final Office Action mailed Nov. 27, 2013 in U.S. Appl. No. 13/957,810, filed Aug. 2, 2013.
Panasonic Corporation, Video Cassette Recorder (VCR) Operating Instructions for Models No. PV-V4020/PV-V4520.
Passenger Transportation Mode Brochure, May 2, 2005.
Patent Abstracts of Japan vol. 007, No. 180 (P-215), Aug. 9, 1983 & JP 58 085110 A (Mitsuhisa Ichikawa), May 21, 1983.
Patent Abstracts of Japan vol. 011, No. 292 (E-543), Sep. 19, 1987 & JP 62 091092 A (Ok Eng:KK), Apr. 25, 1987.
Patent Abstracts of Japan vol. 012, No. 001 (M-656), Jan. 6, 1988 & JP 62 166135 A (Fuji Electric Co Ltd), Jul. 22, 1987.
Patent Abstracts of Japan vol. 014, No. 222 (E-0926), May 10, 1990 & JP 02 056197 A (Sanyo Electric Co Ltd), Feb. 26, 1990.
Patent Abstracts of Japan vol. 017, No. 039 (E-1311), Jan. 25, 1993 & JP 04 257189 A (Sony Corp), Sep. 11, 1992.
Patent Abstracts of Japan vol. 017, No. 521 (E-1435), Sep. 20, 1993 & JP 05 137144 A (Kyocera Corp), Jun. 1, 1993.
Patent Abstracts of Japan vol. 1996, No. 09, Sep. 30, 1996 & JP 08 124069 A (Toyota Motor Corp), May 17, 1996.
Patent Abstracts of Japan vol. 1997, No. 10, Oct. 31, 1997 & JP 09 163357 A (Nippon Soken Inc), Jun. 20, 1997.
Patent Abstracts of Japan vol. 1998, No. 02, Jan. 30, 1998 & JP 09 272399 A (Nippon Soken Inc), Oct. 21, 1997.
Patent Abstracts of Japan vol. 1998, No. 8, Jun. 30, 1998 & JP 10 076880 A (Muakami Corp), Mar. 24, 1998.
PCT/US2010/022012, Invitation to Pay Additional Fees with Communication of Partial International Search, Jul. 21, 2010.
Peter G. Thurlow, Letter (including exhibits) Regarding Patent Owner's Response to Initial Office Action in Ex Parte Reexamination, Mar. 27, 2012.
Preliminary Claim Construction and Identification of Extrinsic Evidence of Defendant/Counterclaimant SmartDriveSystems, Inc. in *DriveCam, Inc. v. SmartDrive Systems, Inc.*, Case No. 3:11-CV-00997-H (RBB), for the Southern District of California. Nov. 8, 2011.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.
Ronnie Rittenberry, 'Eyes on the Road', Jul. 2004.
SmartDrives Systems, Inc's Production, SO14246-SO14255, Nov. 16, 2011.
Supplement to DriveCam's Disclosure of Asserted Claims and Preliminary Infringement Contentions' in *DriveCam, Inc. v. SmartDrive Systems, Inc.*, Case No. 3:11-CV-00997-H-RBB, for the Southern District of California. Oct. 14, 2011.
The DriveCam, Nov. 6, 2002.
The DriveCam, Nov. 8, 2002.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167, filed Mar. 16, 2006 entitled, "Vehicle Event Recorder Systems and Networks Having Integrated Cellular Wireless Communications Systems".
USPTO Final Office Action for U.S. Appl. No. 11/297,669, mailed Nov. 7, 2011, 15 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Nov. 6, 2009, 9 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Nov. 19, 2007, 7 pages.
USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 11/297,669, mailed Apr. 28, 2011, 11 pages.
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011.
Written Opinion issued in PCT/US07/68328 on Oct. 15, 2007.
Written Opinion of the International Searching Authority for PCT/US2006/47042. Mailed Feb. 25. 2008 (5 pages).
Written Opinion of the International Searching Authority for PCT/US2006/47055, Mailed Mar. 20, 2008 (5 pages).
Inovate Motorsports, OT-1 16 Channel OBD-II Interface User Manual, Version 1.0, Nov. 28, 2007, pp. 3, 4, 21 & 27.
Trivinci Systems, LLC, Race-Keeper Systems User Guide, Jan. 2011, v1, 1.02, pp. 34 and 39.
USPTO Non-Final Office Action for U.S. Appl. No. 14/036,299, mailed Aug. 12, 2014.

* cited by examiner

MEMORY MANAGEMENT IN EVENT RECORDING SYSTEMS

FIELD OF THE INVENTION

The following invention relates to electronic storage of data. More particularly, the present invention relates to systems and methods for memory allocation and writing in devices recording vehicle events.

BACKGROUND OF THE INVENTION

Video recording systems are commonly used to monitor places where it may be desirable to monitor security levels. For example, in a security zone, breaches of security may be recorded if video monitors area arranged around the space to be monitored. When an incident occurs, a video record of the related activity is available from the recording system.

During periods when no breaches of security occur, a considerable amount of data is still generated by the video recording system, which has little or no value. Thus, such data can be readily discarded without loss. The act of 'discarding' data amounts to merely rewriting new data over old recorded data. Indeed, most video security systems are arranged with a recording medium that is reused continuously.

When a video camera generates an amount of image data sufficient to fully consume the available memory, newly collected data is recorded at the beginning of the memory. Therefore, the act of writing newly acquired data causes old data to be discarded; that is, the old data is lost to the 'write' operation of the newly collected data.

In old videotape systems, this is sometimes called a 'round robin' arrangement. A memory medium fashioned as a tape in a continuous loop provides data storage for those video security systems. In such systems the tape has no end and no-beginning, but instead the tape continuously passes by a recording head where new images are written to the tape and at the same time old images are discarded.

When an incident of interest occurs, the tape may be stopped to prevent loss of data which relates to the relevant incident. The related images may be recovered from the tape and transferred to a permanent medium, while the tape is returned to the video system for further recording. Such re-use of memory is well known in the prior art.

In a round-robin scheme, the data that is overwritten, or discarded, is the data which came into the system earliest, or was 'first in' the system. This arrangement is sometimes referred to as "first-in, first overwritten," which is analogous to the "first-in, first-out" arrangement in electronic buffer systems. In both cases, we will refer to this method as FIFO.

A FIFO base system is generally a very good system for buffer management, because the oldest data in a buffer is typically the least valuable. Therefore, the oldest data, or the least valuable data, may be discarded without regard for its loss. However, in buffer systems the earliest received data, or the 'first-in' data, may not always be the least valuable data. In some instances it may be advisable not to overwrite the oldest data, but rather to provide an overwrite scheme which preserves certain portions of interest of the oldest data.

With specific reference to the monitoring of vehicle activities, vehicle event recorders are video recorder systems mounted within the vehicle to provide a video record related to the environment surrounding a vehicle during its operation. These systems are known in the art and are employed, for example, in conjunction with police activity. Many police departments in the United States are equipped with vehicle event recorders, which capture activity, sometimes criminal, occurring in the proximity of a police vehicle.

The application of vehicle event recorders is not limited to police vehicles. More and more commercial vehicles are now equipped with systems that record activity associated with the use of the vehicle and within the environments in which the vehicle is used. These systems are particularly advantageous with fleet vehicles that are subject to heavy professional use and frequent incidents, including traffic accidents, theft, and vandalism, among others. With a video record, vehicle fleet managers are better equipped to manage and control costs associated with operations of large vehicle fleets. Safety is improved, driver performance is improved, a better understanding of accidents is achieved, and other benefits are derived from the use of vehicle recorder systems.

Vehicle recorder systems are described, for example, in U.S. Pat. Nos. 6,389,340, 6,405,112, 6,449,540, and 6,718,239, all to Rayner. In general, these inventions relate to a small device mounted on the vehicle rearview mirror to capture video images of traffic incidents ahead of the vehicle.

In particular, the '112 patent discloses a system that includes a vehicle operator performance monitor, which records a video of the vehicle operator, and which may be used to determine how the operator's actions affect use of the vehicle.

The '540 patent instead is an event recorder mounted in a vehicle, which includes one or more wave pattern detectors for detection and recognition of a predetermined wave produced outside the vehicle, and for producing a trigger signal denoting the presence of the predetermined wave. In particular, a detective wave is a wave of the type produced by a police or fire department emergency vehicle. Detection of this wave triggers a capture function which stores video images a long-term storage memory.

The '329 patent includes a video recorder system having a one-way hash function to perform a validation function. This way, the integrity of the recorded video data can be protected.

Finally, the '340 patent teaches a recording system having a certain relationship between two different types of memory. A first memory is arranged to store video for the short-term and to transfer some of that stored video in response to a trigger event. Data from this short term memory is transferred to a more durable and long term memory, and the short term memory is continuously overwritten in a scheme described by Rayner as "first-in, first-overwritten". This way, Rayner teaches the coupling of a high-speed, high-performance volatile semiconductor memory with a flashlight memory good for long-term storage of large amounts of data even when power is removed. As will be described in detail later, Rayner's first in first overwritten scheme necessarily creates a loss of important and valuable data.

While systems and inventions in the prior art are designed to achieve particular goals and objectives, these inventions also include limitations which prevent their use in more extended applications, and cannot be used to realize the advantages and objectives of the inventions taught hereinafter.

SUMMARY OF THE INVENTION

It is an object of the present invention to provide high-performance memory allocation systems for vehicle event recorders.

It also is an object of the present invention to provide for set memory allowances and for extended recording periods.

It is a further object to provide memory overwrite schemes that provide a time dilation on either end of a recording period.

These and other objects of the present invention are accomplished by apparatus and methods for allocating memory in vehicle event recording systems that provide improved memory allocation and writing schemes to preserve data over extended time periods, thereby improving prior art devices and methods that cannot record events over a large time range when equipped with a memory of a predetermined size.

One difference between memory allocation of the present invention and the prior art can be seen in relation to time dilation, which may be applied on the extremities of discrete capture periods. In one embodiment, a memory of limited size is subject to an advanced managed loop memory allocation scheme and the rate of storage frame is adjusted throughout a predetermined capture time period. At the extremities of a time period, a frame capture process is subject to a reduced frame rate. In the proximity to an event of interest, or an 'event moment', the frame rate-is increased to improve detail around that particular time, enabling a greater temporal range at the expense of temporal resolution. Losses in temporal resolution are however pushed away from the event moment and allocated to the extremities of the capture time period.

An overwrite scheme selects which frames are expired and subject to being discarded. At any random moment, video is continuously captured at a maximum frame rate. However, these frames are not stored into memory in a conventional first-in, first overwritten manner, but rather, these frames are added to the memory locations which are determined to be available in accordance with the overwrite scheme. Therefore, the oldest frames are not necessarily those that are overwritten. Quite to the contrary, an overwrite action may be applied to a frame which is newer than at least one other frame stored in the memory.

As a result, newly acquired frames are placed into memory in processes which necessarily cause older frames to be discarded. However, the newly captured frames are written to memory positions in an 'interleaved' fashion, whereby some of older frames are preserved. When a capture event occurs, data in the memory may be transferred to a more permanent storage. When data is transferred, a timeline is reconstructed. The recorded timeline is unique in that it contains various frame rates over the capture period. At both the beginning and at the end of the capture period, the frame rate is modest. At the point of greatest interest in the capture period, the frame rate is the highest. This throttling of frame rate provides for a memory of given size to accommodate a timeline of greater temporal extent.

BRIEF DESCRIPTION OF THE DRAWINGS

These and other objects and advantages of the present inventions will become better understood upon consideration of the following description, taken in conjunction with the accompanying drawings, in which.

DETAILED DESCRIPTION OF THE INVENTION

Figure 1:
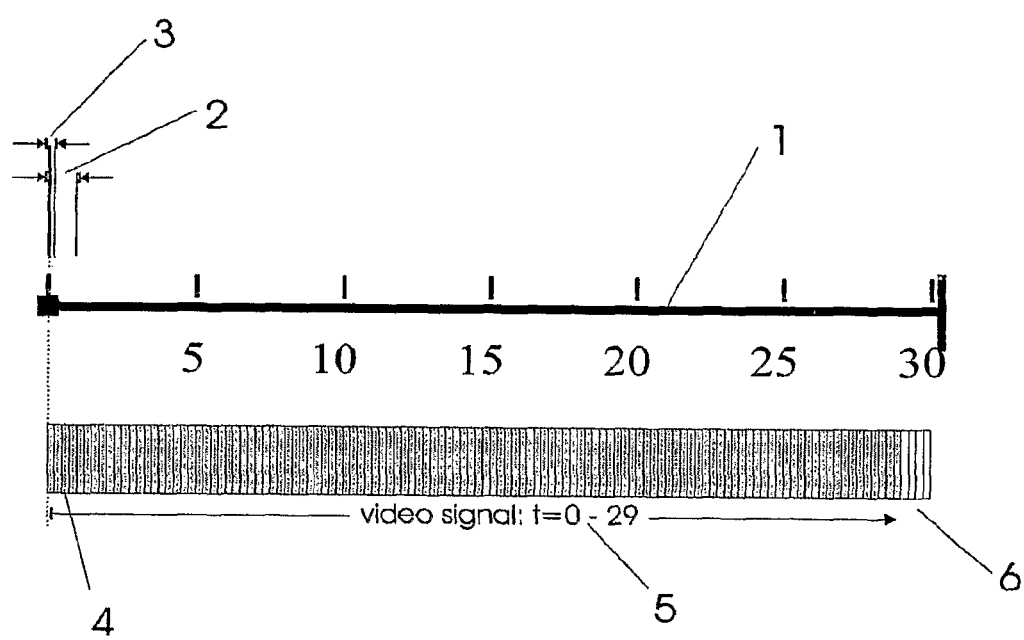
FIG. 1 is a timeline illustration in conjunction with a graphic that illustrates a plurality of memory bin units.

The present invention relates to apparatus and methods are provided for overwriting memory in vehicle event recorder systems. Embodiments are described hereinafter, that are constructed in accordance with the principles of the present invention, In order to facilitate the understanding of the described embodiments, definitions are provided for terms that may not be readily available in popular dictionaries.

Vehicle Event Recorders: Video image recording systems which are responsive to triggers indicative of some event of interest.

Time Dilation: An expansion of a video sequence timeline by way of frame rate manipulation.

Trigger: Electronic means for setting some instant in time associated with a particular event of interest and further for causing initiation of some associative processes.

Expanded Timeline Definition: A prescribed set of rules which sets forth and defines a timeline associated with a video frames sequence having more than one frame rate associated with any particular portion of the timeline.

Overwrite Manager: A computer module determining, in accordance with an expanded timeline definition, which data recorded in memory and associated with a particular video frame is to be discarded and may be overwritten with data from a newly collected video frame.

Video event recorder systems are typically built around and deployed with memories of limited sizes, in order to contain cost. While mass storage and mass storage management may be included in such devices, for example, a computer-type hard drive, these types of components remains quite expensive, causing overall systems to double in cost if such memories were included. Instead, a 'lightweight' memory solution is envisioned in the present invention, in which an abbreviated memory or memory buffer is used to temporarily store information collected during a predetermined time of service, for example a day, of a vehicle equipped with this type of video event recorder. Upon return to base, a vehicle may transfer the information collected to a different memory for management and analysis. Accordingly, the present invention makes it possible to equip vehicles with video event recorders having very inexpensive cameras and memory.

Memories of such video event recording systems are preferably handled in the following manner. A memory system is divided into two portions: a fast, managed loop memory buffer, and a temporary mass storage memory.

Video continuously received from a video camera may be put into the fast memory buffer. However, the amount of data generated by a video system is quite extensive and most of the time totally uninteresting, but certain portions of the video may become of great interest. For example, when a vehicle is involved in a traffic accident, the captured video may yield important clues as to fault, cause, identity, and response, among others. In this event, it is important to preserve video data associated with these select video capture periods.

To this end, a trigger is arranged, whereby the occurrence of some incident of interest, such as an automobile accident, causes data stored in the memory buffer to be transferred to a more permanent memory facility. Old data in the memory buffer is continuously overwritten by new data received from the video camera in real-time. In common and simplistic versions, this step is performed in a "first-in, first-overwritten" manner.

Because the memory buffer is limited in its capacity to store video frames, "first in first overwritten" schemes provide a timeline of limited extent. For example, at a frame rate of four frames per second, a given memory buffer may be suitable for storing 30 seconds of video frame data, or a 30 second video timeline. In 'first-in, first overwritten' schemes, this timeline may be arranged as 15 seconds of continuous video before a trigger event and 15 seconds of continuous video after a trigger event.

However, a continuous frame rate throughout the entire event capture period need not be maintained. It is possible to have a modest frame rate at times associated with the capture period extremities, and a high frame rate during periods around an event trigger. Therefore, the storage frame rate may be adjusted throughout a prescribed capture time period, allowing for an extended temporal range. Instead of a 30 second timeline, is entirely possible to have a 48 second timeline for the same memory. Such a timeline may be embodied as 12 seconds of video at a frame rate of one frame per second for the periods of time furthest apart from the event trigger, both before and after. In addition, the video sequence may include video for 24 continuous seconds, 12 seconds before and 12 seconds after an event trigger, at a video frame rate of four frames per second. This way, the temporal range is extended but the temporal resolution is compromised in the time periods furthest from the trigger event.

To create such a managed loop memory buffer management system, an overwrite scheme is provided to select which frames are 'expired' and no longer part of the particular extended timeline scheme. It should be remembered that video is continuously captured at all times, and that video is captured at the maximum frame rate, because it is not known in advance when an event trigger will occur. Accordingly, the system always captures video at the maximum frame rate as the capture frame rate cannot be adjusted in view of any event trigger which may come in the future.

Video captured at the maximum frame rate is put into the memory and as it is put in the memory it displaces previously recorded video frames. These frames are added to the memory locations determined to be available in accordance with a prescribed overwrite scheme such as the one mentioned above. However, this step is provided differently from a first in first overwritten scheme. In the presently described embodiment, most frames being overwritten are actually newer than at least one other frame stored elsewhere in the memory buffer. Newly captured frames are written to memory positions in a pseudo-'interleaved' fashion while some of older frames are preserved.

When a trigger event occurs, data in memory is transferred from the memory buffer to a memory of more permanent nature. When such data is transferred, an expanded timeline is reconstructed as a timeline having at least two frame rates. At the extremities of the capture period timeline, the frame rate is reduced. At and about the point of greatest interest (trigger event) the frame rate is maximized during the capture period. This 'throttling' of frame rate provides for a memory of preset size to accommodate a timeline of greater temporal extent, although in some places resolution may be reduced.

Referring now to FIG. 1, a first timeline is shown that is associated with a memory system divided into a plurality of memory bins. For exemplary purposes, some arbitrary numbers for memory size, number of bins, video frame rates, etcetera, have been selected. It is to be understood that these are not necessarily preferred values, but values selected to promote an understanding of the example provided.

The memory related to FIG. 1 is a high-speed, high-performance memory of limited extent, and is arranged as a buffer. This memory communicates with incoming video data recorded by a video camera, and its output is directed to another means for data storage means, such as a memory system having a greater capacity but lower speed, for example a semiconductor DRAM type memory. Alternatively, the memory of FIG. 1 may be a non-volatile, high-performance memory based on ferromagnetic principles, which can respond in real-time to video collected by a video camera, but is of limited size and not suitable for saving the mass amounts of data generated by video image systems.

In general, the memory of FIG. 1 may be limited to a few megabytes and may temporarily hold a limited number of video frames, which may or may not be transferred to a more permanent memory in a transfer operation. In particular, the memory may be divided into 120 bins, with each bin be sufficient for storing the data associated with a single video frame.

A timeline 1 is associated timeline 1 with this memory, and is comprised of a 30 second time interval. The timeline is marked in the Figure from 0 to 30. A one second interval 2 is illustrated at the beginning of the timeline. Further, that one second interval is divided into quadrants, representing a quarter of a second interval 3. For the video systems of immediate interest, his quarter of a second interval nicely accommodates a single video frame (implicitly setting a frame rate of four frames per second). While most modern video systems have far higher performance than recording four frames per second, four frames per second is a useful rate for vehicle recorder systems, which tend to have limited memories in the interest of maintaining a low cost. Further, the kinds of events being recorded in vehicle recorder systems are appropriately captured with frame rates of a few frames per second.

When video images are captured by a camera, frame-by-frame, each frame images can be recorded into a memory bin 4. A first frame is recorded and put into a first memory bin. Thereafter, a quarter of second later, a second frame is recorded and put into an another memory bin, for example, an adjacent bin. This frame-by-frame recording scheme may continue for up to 30 seconds before all memory bins becomes full and the supply of empty bins is exhausted. In FIG. 1, the first 116 memory bins are shaded to indicate that one frame each of video data has been written to those bins. This is equivalent to recording of a video signal 5 of four frames per second for 29 seconds. FIG. 1 also illustrates four empty memory bins 6, which would be filled in the next second of video recording. Because the recording of video images in this manner is known in the art, Figure a is labeled as prior art.

Figure 2:
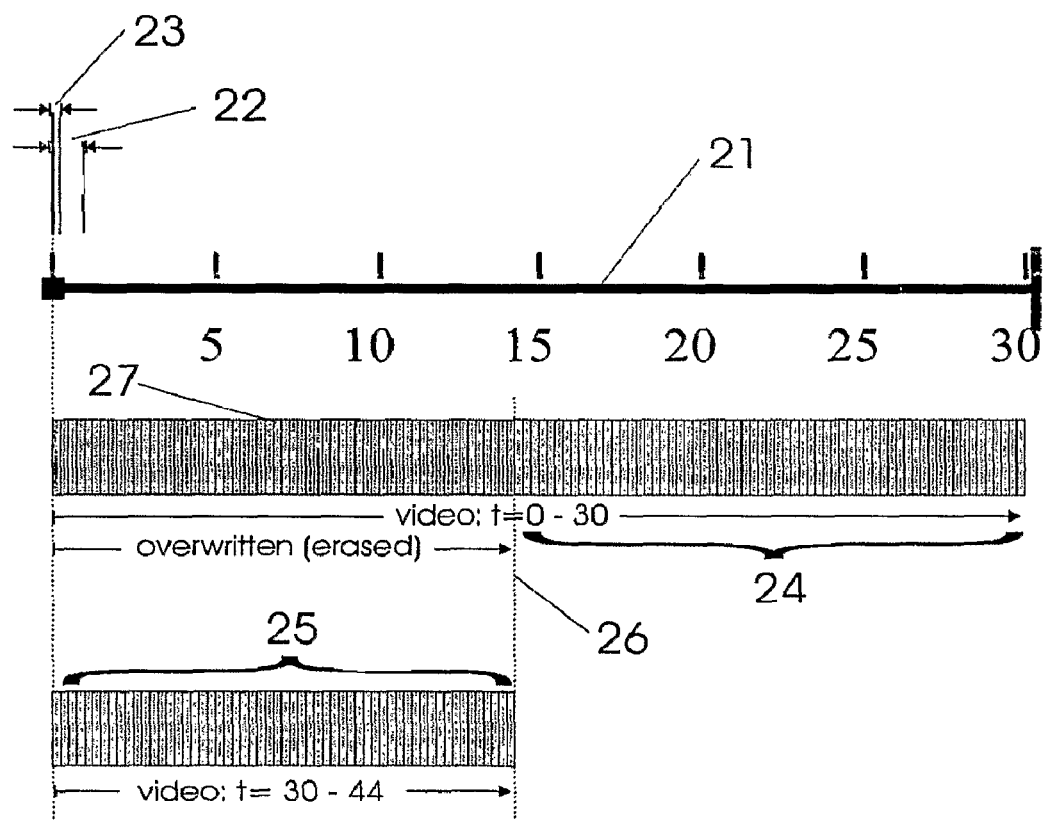
FIG. 2 is a timeline illustration and memory graphic illustrating an overwrite operation.

FIG. 2 illustrates a similar timeline 21 in conjunction with a graphical illustration of a memory having 120 memory bins. As in FIG. 1, a time interval equivalent to one second 22 as well as a time interval of one quarter second 23 is illustrated for reference. The graphical depiction of the memory includes lightly shaded areas 24 and 25. The memory bins presented as 24 represent those bins having data written thereto from a video which was collected from a time t=14 up to a time t=30. The demarcation indicated as dotted line 26 indicates time t=14. At time t=30, the memory is completely full. Video data collected for 30 seconds at four frames per second fills 120 memory bins. The video data collected at time t=31 cannot be saved to memory unless a portion of the memory already allocated and consumed in a previous data write step is overwritten. Thus, in the graphic of FIG. 2, memory bins indicated by 25 on a second line represent-that video frame data that is recorded in these memory bins at the expense of data captured 30 seconds prior. Accordingly, for the time period indicated, i.e. video data collected from t=0 to t=14, that video data is lost to an overwrite step. In FIG. 2, those bins shaded dark are indicated as 27, representing the over-written bins. This illustrates the so-called 'round-robin' or 'first-in, first-overwritten' FIFO memory management schemes. Since these schemes are also known in the art, FIG. 2 is also labeled as prior art.

The FIFO memory management scheme is very useful. When a new video frame is collected by the video camera, it is placed into memory at the same location as the oldest frame in the memory which is discarded in the overwrite step. Therefore, the FIFO memory management scheme implies that the oldest video information in the memory is the least valuable.

The memory described is a buffer memory, that is, this memory temporarily holds the data of a video series for some specified time, but also continuously discards previously recorded information. When the buffer contains a data set associated with an important event, that data is transferred from the buffer memory to a more permanent memory before becoming subject to being lost by overwrite actions. A video series becomes 'important' when a detectable event occurs which implicitly indicates video is valuable; for example, if a vehicle is involved in a traffic accident, accelerometers can detect the accident and trigger a transfer of data from the buffer memory to a permanent memory.

In those vehicle event recorder systems, a trigger is sometimes arranged to indicate that such an event has occurred, that is, an event for which the video images associated therewith may be of extreme importance. In this case, the short term buffer memory of 120 video frames should be transferred to a more permanent long-term memory for example, a durable flash type memory.

Figure 3:
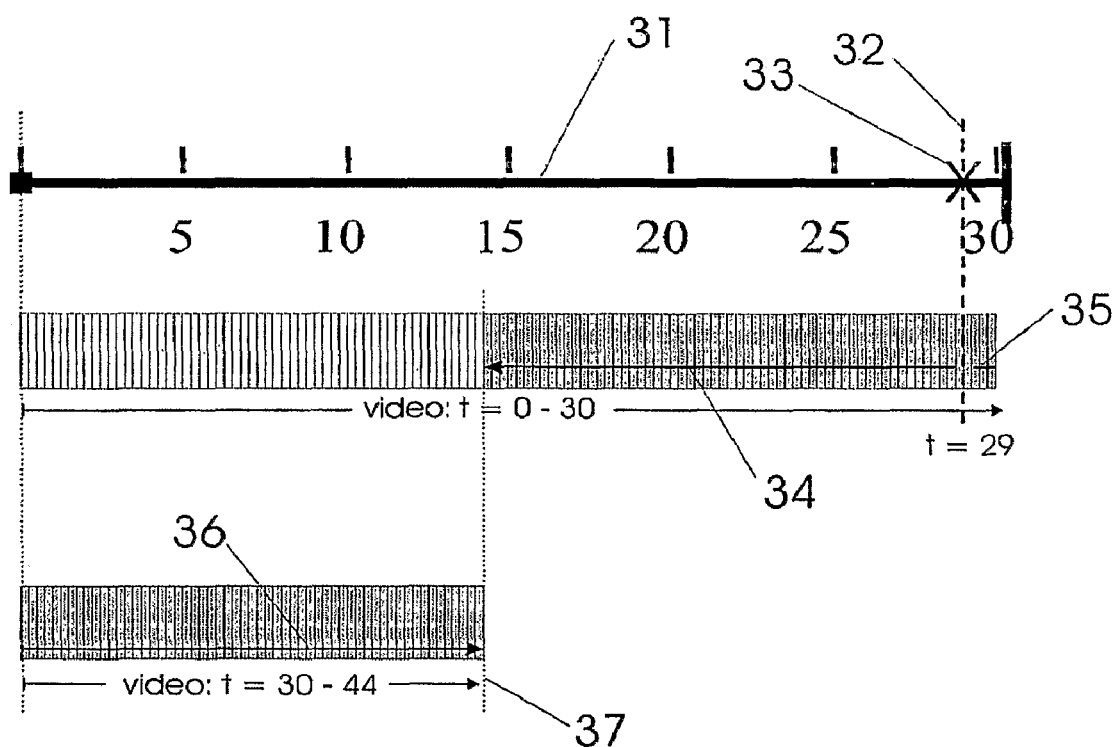
FIG. 3 illustrates the overwrite operation in conjunction with a trigger event.

FIG. 3 is directed at illustrating a timeline which includes an event moment. FIG. 3 includes a timeline 31, and the dashed line 32 to indicate the 29th second along with a marker 'X' 33 to indicate a trigger event has occurred at the 29th second. When a trigger event occurs, it is important to preserve the video data which occurred after the accident as well as the video data which occurred before the accident. Video images collected during a time period starting 15 seconds before the accident are in the bins indicated by 34; i.e. those video image frames collected between t=14 and t=29. Memory bins at the end of the time line indicated by 35 include four video frames collected during the first second after the accident. Video image frames collected between t=30 and t 44 are placed in the memory bins indicated by 36. Thus, the memory buffer contains video images for the 15 seconds prior to the accident and the seconds after the accident. Because the memory is of limited size, it can only hold video image data which represents 30 seconds of video recording.

At this point in time, no new frames are recorded to memory; overwrite is prevented, and the memory buffer is "locked". Rather, the system pauses to transfer data in the buffer memory to a permanent flash memory. After data is successfully transferred to the flash memory, the buffer is "unlocked" and may be used again in the fashion described. As video data which was placed into buffer memory bins between time t=30 and time t=44, it caused older data to be displaced, overwritten and forever destroyed. Data which was recorded between t=0 and t=14 is completely lost and no access is possible any more to this information, which at one time resided in those memory bins, because that information was destroyed in the overwrite step. However, some of this information may be very valuable and, accordingly, it is quite undesirable to lose it entirely; in fact, some of this data may be more important than data which saved in its place.

Since the moments leading to a vehicle accident can explain a great deal about the what actually happened, it is highly desirable to have at least some limited information that relates to the accident scene at t=1, for example. If one can just see one frame at t=1, that may be extremely valuable in explaining what happened in the accident. Therefore, the FIFO scheme may actually destroy critically useful data.

Figure 4:
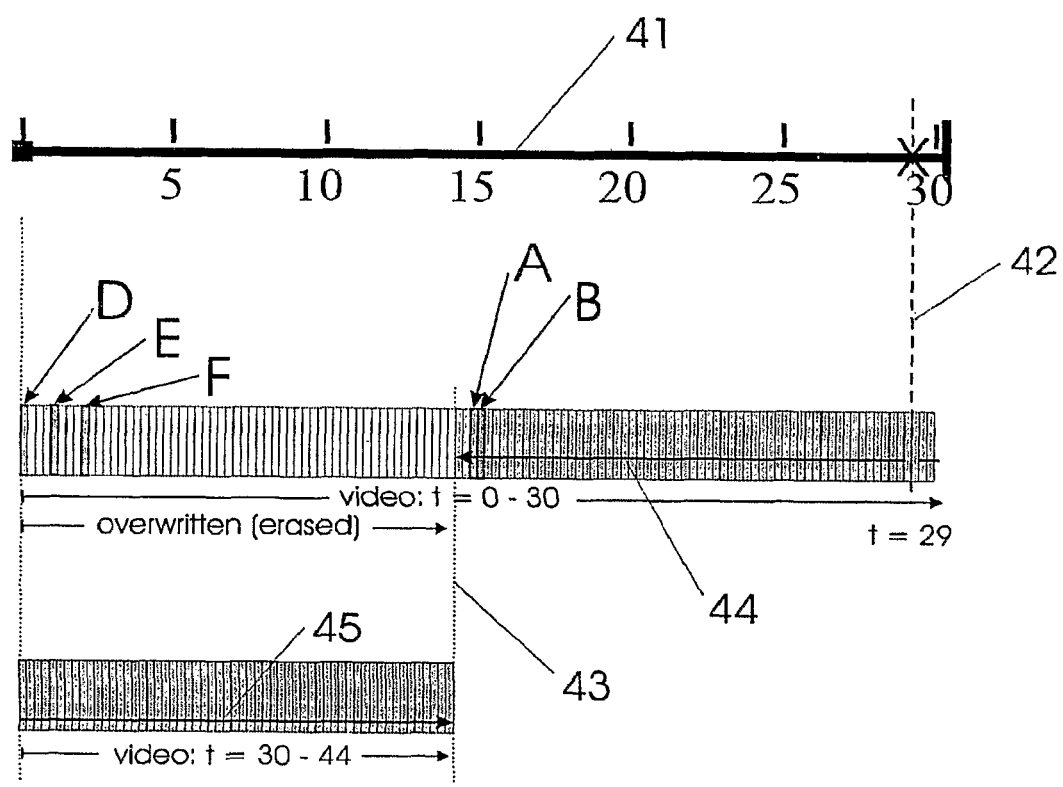
FIG. 4 illustrates particular memory bins with various levels of importance associated therewith.

This is also apparent from FIG. 4, which explicitly shows certain bins A-F associated with various points of the timeline 41 and with reference to trigger event 42 time at time t=29. The following discussion further illustrates the importance of bins A-F.

In a FIFO system, all memory bins, indicated by reference numerals 44 and 45, are preserved in the memory buffer. Amongst the oldest recorded video frames remaining are those which reside in memory bins A and B, and which represent two adjacent frames, or frames captured within a quarter of a second from each other. Since these frames represent images very close in time, these frames are expected to be quite similar to each other. While it is sometimes desirable in video systems to have high temporal resolution, i.e. as many frames per second as possible, one will appreciate that at higher frame rates, a frame will contain very similar information as the frame closest thereto. Accordingly, where memory is limited, these adjacent frames lose their importance as most of the information contained in each frame is similarly contained in the adjacent frame. Thus, if we keep frame A and discard frame B, most of the information of frame B can be known by examining frame A.

On the other hand, frames D, E and F, which are discarded in a FIFO system, may actually contain extremely important information. Frame D is separated in time from frame E by one second. In a video scene, there may be considerable differences between one frame captured an entire second later than another frame. Further, frame D occurs a full 29 seconds before the trigger event. In a traffic accident, it can be quite useful to know about what was happening at time periods before and after a trigger moment. Thus, it may be possible in a memory having a finite number of memory bins to trade some of the bins associated with less important time slots for bins associated with time slots having a greater importance. If we discard frame B, and preserve frame D, we may gain a greater overall understanding of the incident being recorded. In effect, we can trade some time resolution (frame rate) at t=15, for improved overall temporal range to realize an extended timeline.

One skilled in the art will notice that if video data associated with a frame rate of one frame per second was preserved, in seconds 1-12, then 36 memory bins into would remain available, which would accommodate newly captured video data. Thus, rather than completely overriding the oldest video data in memory, one can perform an overwrite action on 3 of every 4 memory bins in the overwrite portion of the timeline, thereby maintaining $\frac{1}{4}^{th}$ of the oldest video data in those memory bins. That is to say, for the oldest video data in memory, it may be useful to save one frame per second. To this end, when the overwrite operation is executed, new data is written to three memory bins, before one bin is skipped, and the process is repeated.

Timeline 51 includes a trigger event 52 at time t=29. In one overwrite scheme of interest, it is required that a timeline be comprised of 12 seconds of low temporal resolution, 24 seconds full temporal resolution and a further 12 seconds of low temporal resolution. This is further defined in detail as: a 12 second period of one frame per second video, a 24 second period of four frames per second video, and finally a 12 second period of one frame per second; for a total video sequence of 48 seconds. Since it cannot be known at what time in the future an event trigger will occur, a data overwrite scheme must preserve data associated with various frames, of which a prescribed timeline is comprised. In the present example, continuous video data at a frame rate of four frames per second is preserved for a period of 12 seconds 54 before the trigger event; that data is in memory bins indicated by 53. While in the FIFO system one can preserve data at four frames per second for up to 15 seconds before and after the trigger event, in the system of the present embodiment only 12 seconds of four frames per second data be kept. However, it will be shown that the present embodiment enables the expansion of the total timeline of the video sequence to 48 seconds in contrast to the 30-second timeline of the FIFO system.

In the 31st second, the first overwrite operation begins. Whether or not a trigger has occurred, newly captured video data is written to every three out of four memory bins, leaving the fourth memory bin undisturbed. Therefore, old data is preserved, albeit at one quarter of the frame rate from which it was originally recorded. Video data after the trigger event is recorded in the memory bins 55 at a frame rate of four frames per second. Just because some bins are skipped, the frame rate of video data collected after the trigger event is not necessarily reduced. This is readily understood in consideration of the time point indicated by 57 which indicates the time t=41 seconds, while, without skipping bins, this point in memory would have been time t=45. Careful observation will prove that the bins indicated by 55 will accommodate data at four frames per second for the entire 12 seconds after the event trigger.

Figure 6:
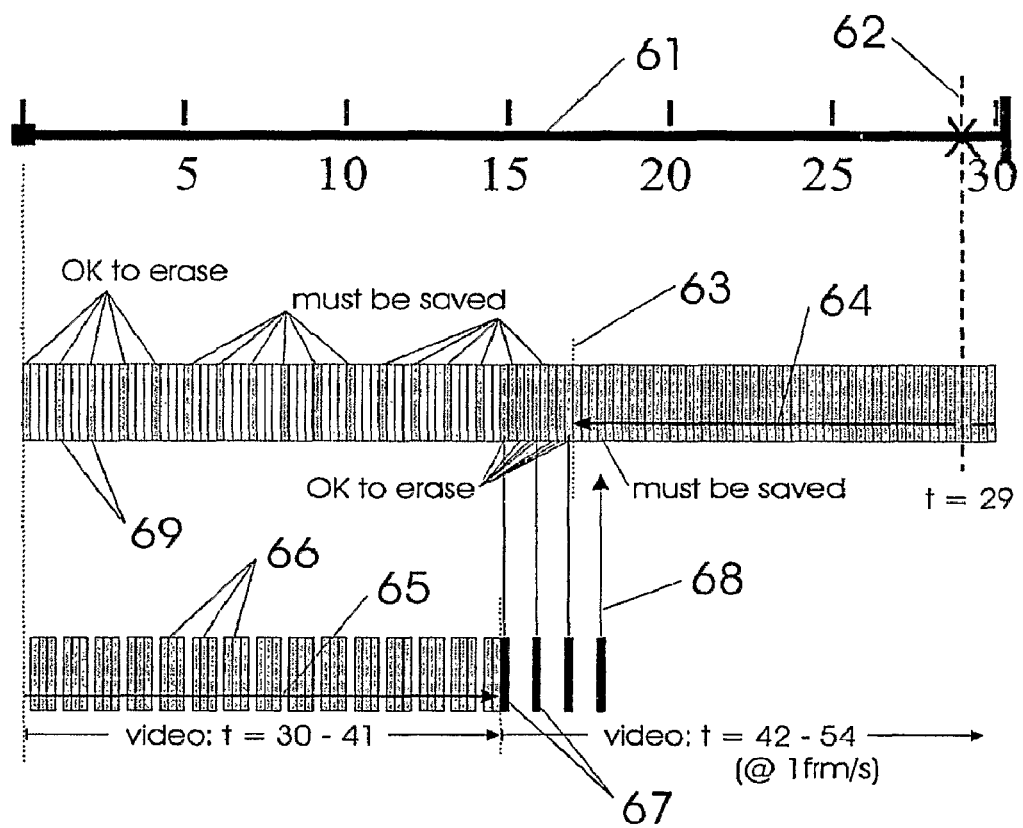
FIG. 6 further illustrates this overwrite scheme near the end of memory space.

After the time point indicated by 57, several memory bins remain available for further overwrite operation before reaching the memory bins which contain data to be. preserved in agreement with the timeline definition 12/24/12. At least some of those memory bins up to the position indicated by 54 are available for overwrite. After the full 12 seconds of four frames per second video is recorded, it is desirable to continue recording video data at one frame per second for an additional 12 seconds. Data captured in this period can be stored in memory bins, which are scattered in various locations about the memory buffer. FIG. 6 illustrates on example of such locations.

More particularly, FIG. 6 illustrates memory bin locations which are available for overwrite as the memory approaches its full capacity for the particular schemes presented herein. Once a trigger event occurs, i.e. is set in time, it is possible to compute which video frames must be saved in accordance with the particular timeline definition, and which frames may be discarded. For example, 48 frames at four frames per second may be preserved immediately before the trigger event. In addition, 12 frames at a video rate of one frame per second may be preserved for the time t=5 up to t=17. These frames must be protected from any further overwrite operation, and are marked "must be saved" in FIG. 6. These frames are saved as they are included in the timeline definition.

All frames which precede t=5 are in condition for being discarded. that is, such frame lie outside the time range which is to be preserved. Accordingly, frames indicated for example as 69 have aged sufficiently and are may be erased. These are the frames which originally were preserved in the overwrite operation as skipped frames.

Video frames captured after the trigger event are also saved in the memory. For 12 seconds after the trigger event, t=29 to t=41, video is captured at a rate of four frames per second. Such a video data 65 is put into memory in accordance with the need to save particular frames of the oldest video data. When all video frames from the period t=29 to t=41 are properly recorded, the system continues to record data at the frame rate of one frame per second. This is different from the earlier operation, in which the overwrite action resulted in the preservation of one frame per second.

For the time period 12 seconds after the event trigger up to 24 seconds after the event trigger, data is put into memory at the reduced frame rate of one frame per second. Other frames may be captured by the camera, but are discarded before entering the memory or instantly thereupon. Thus, the frames represented by 67 are put into memory bins which are available in accordance with the "OK to erase" label in the drawing. A person skilled in the art will note that after three of these frames are placed in the memory, the fourth frame 68 cannot be placed into the memory in the same repeating geometric position. That is to say, those memory bins are not available for overwrite. Therefore, video captured after that time must be carefully managed and fit into the available memory bins.

Figure 7:
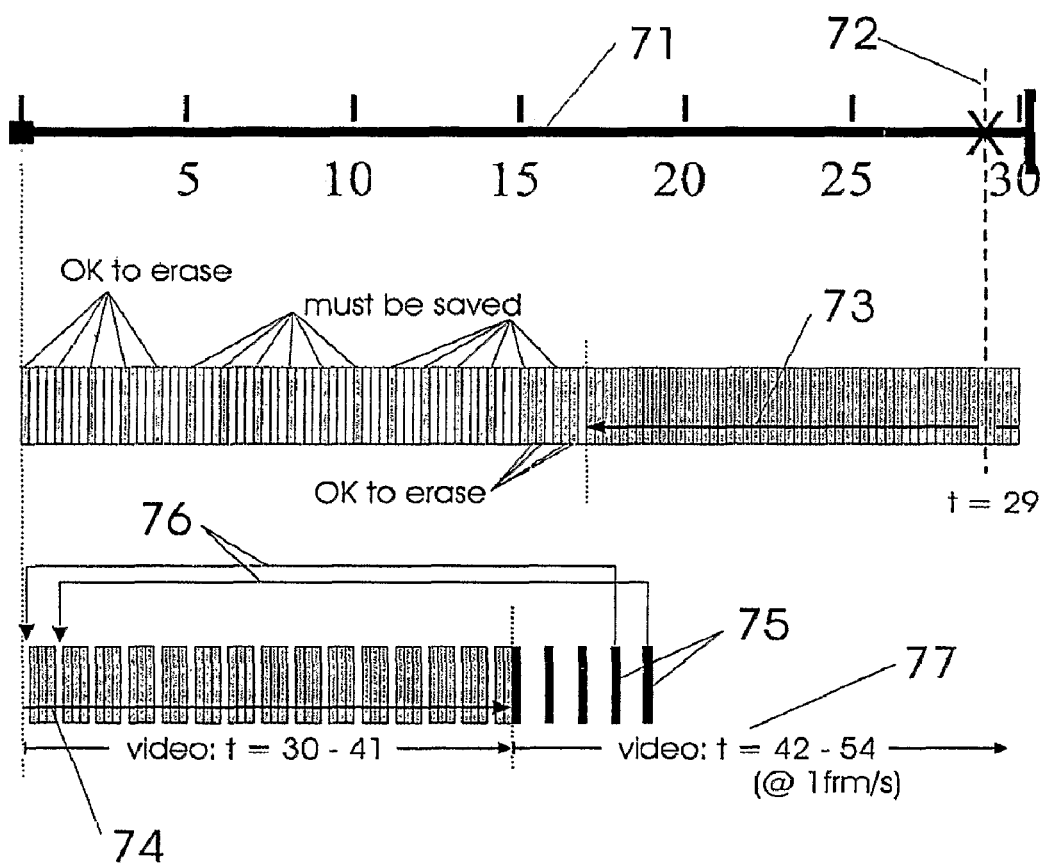
FIG. 7 illustrates memory allocation with pointers to memory bins to be saved and pointers to those bins to be erased.

FIG. 7 illustrates the steps taken in the final filling of the remaining memory bins. In timeline 71, event trigger 72 is situated at time t=29. In agreement with this exemplary timeline definition, video captured at a frame rate of four frames per second from t=17 to t=29 is stored in memory, as indicated by 73. Similarly, video captured for a 12 second period at a frame rate of four frames per second from t=29 to t=41 is stored in memory, as shown by reference numeral 74. Finally, video frames captured during a 12 second period from t=42 to t=54 at a frame rate of one frame per second include those particular frames represented as 75, which must be inserted into the memory bins remaining available for overwrite.

Arrows 76 indicate that these frames may be placed in locations near the beginning of the memory, where data had once been stored but is now expired because the trigger event occurs at t=29. Once a trigger event is established, the bins which may be overwritten can be determined according to the particular rules defining the timeline.

The example of FIG. 7 clearly illustrates that careful management of an overwrite scheme enables a memory buffer to dilate a timeline by manipulating which video frames are preserved and which are overwritten. Consequently, temporal resolution is sacrificed to extend temporal range, that is, the frame rate of "saved data" is altered in order to make more space available for video frames captured further in time from the event trigger. Accordingly, the greatest amount of information can be preserved in a memory buffer of the limited size.

While the example of FIG. 7 illustrates where the data may be written in memory, those skilled in the art will note that the physical positions of memory bins may be altered. Therefore, after a timeline definition is set, an algorithm may be developed defining the bins containing data that has expired and thus implicitly defining a bin available for overwrite at any moment time.

Figure 5:
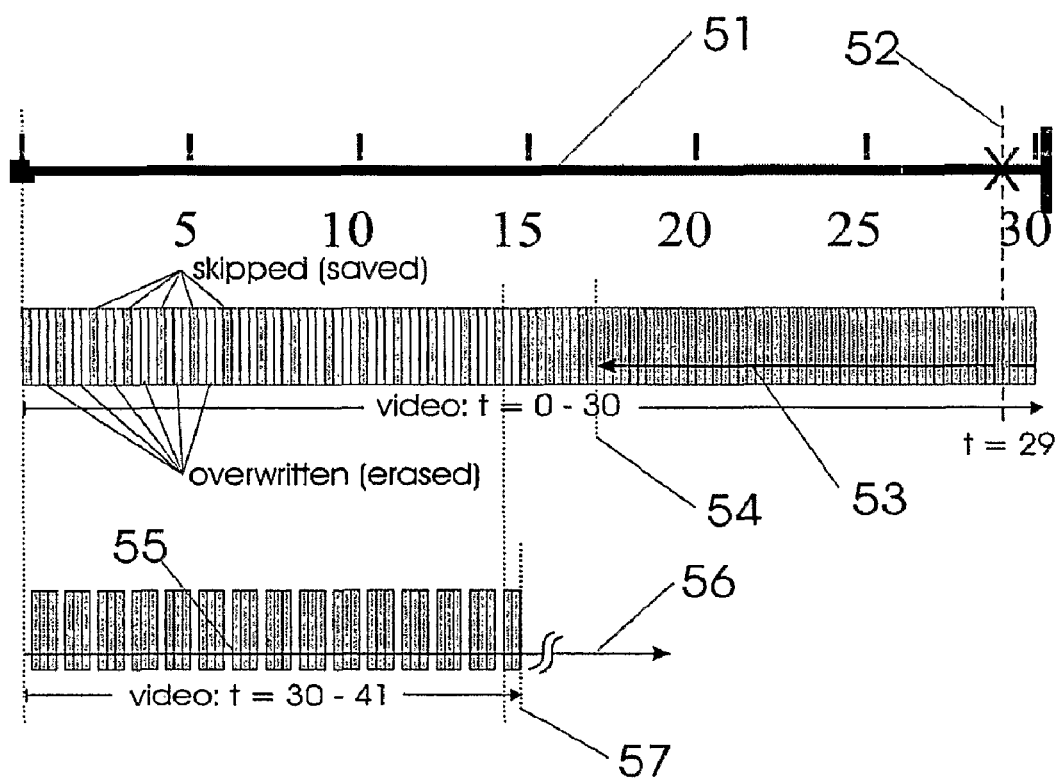
FIG. 5 illustrates an advanced overwrite scheme to protect certain 'high-value' video frames.

While the example presented of FIGS. 5-7 illustrates one possible solution, it should be understood that other arrangements may provide for a time dilation in accordance with the spirit of the present invention, and that specific values may be used that are different from those presented in the above exemplary timeline definition. In another exemplary timeline definition, one might arrange a system whereby two periods of eight seconds are used to capture video of a high frame rate, and two periods of 28 seconds are used to capture data at a low frame rate, thus achieving a total expanded timeline of 72 seconds.

The advantages offered by the above examples do not depend upon the particular values chosen in these examples. One should also recognize that because capturing/saving video at two different frame rates enables a user one to expand the timeline, capturing/saving video at three different frame rates also enables a user to expand the timeline with greater flexibility. Accordingly, the memory may be manages to preserve frames for some time periods at a rate of four frames per second, and in other time periods at a rate of two frames per second, and in still other time periods at a rate of one frame per second. This arrangement provides for very high temporal resolutions for the periods immediately surrounding an accident (trigger event), for medium level resolutions for periods further away from the trigger event, and finally for low temporal resolutions at the extremities of the time range.

Figure 8:
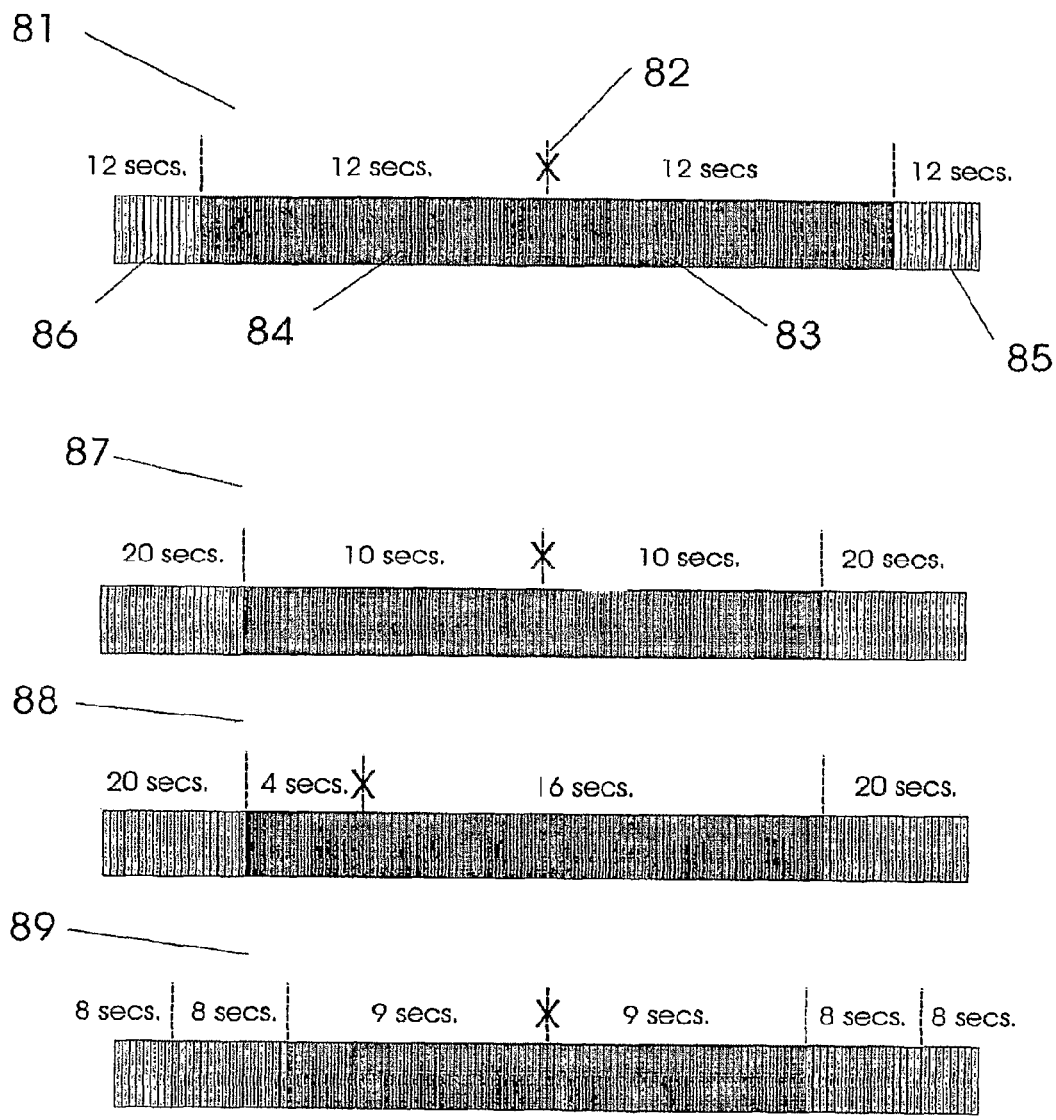
FIG. 8 illustrates four alternative timeline illustration in different embodiments of the invention.

In addition, asymmetric timeline definitions are possible, that is, the time periods on either side of the event trigger may not be equal in extent or in number. A timeline definition may be devised that has a long, high resolution period before the event trigger, and a short high resolution period after the event trigger. FIG. 8 illustrates various timeline definitions of interest, and is related to several examples each working equally well within the common concept of timeline dilation. FIG. 8 graphically illustrates a first memory buffer 81, which was discussed in detail in a previous example, and in which there are two frame rates, namely, a high video frame rate of four frames per second and a low video frame rate of one frame per second.

A trigger event 82 occurring at some instant in time implicitly sets the time periods for any particular example, and time period 83 starts immediately after the trigger event and extends for 12 seconds. A second time period 84 extends from the trigger event to 12 seconds prior to the trigger event. In both of these time periods, video is captured and put into the memory buffer at a rate of four frames per second.

The number of shaded memory bins reflects a frame rate of 4 frames per second. Time periods at the extremities of the timeline, periods 85 and 86, are each also configured to be 12 seconds in length. However, since only one frame per second is collected in those time periods, the number of memory bins consumed is considerably smaller, i.e. ¼ of those consumed in the other time periods. This arrangement provides for a total timeline of 48 seconds, and in memory buffers that do not overwrite/store data at variable rates, the same memory size could only accommodate a timeline of 30 seconds. FIFO memories of the same size are restricted to 30 seconds.

A second example presented as 87 in FIG. 8 suggests two high temporal resolution periods of 10 seconds each. In addition, there are two low temporal resolution periods of 20 seconds each. While there is a reduced overall period of high-resolution video data, the total timeline is extended to 60 seconds.

A third example is presented through the memory buffer of graphic 88, and illustrates that an asymmetric timeline definition may also be configured. The two periods with a high rate of video recording need not be the same in extent. In fact, video may be recorded at a high frame rate for a longer period after a trigger event than that in the period immediately preceding the trigger event. In the present example, video is recorded in the memory buffer for 16 seconds after the trigger event, but only for four seconds prior to the trigger event. Accordingly, the total high-resolution time period is the same as in the previous example, 20 seconds, but greatly favors preserving information after the trigger event, at the expense of information preceding the trigger event.

In a fourth example, there are six distinct time periods comprised in the timeline. Two 9 second periods occur symmetrically about an event trigger. In these time periods video may be captured a rate of four frames per second. Two additional periods each of 8 seconds may be used to record/overwrite data at a frame rate of two frames per second. Two additional 8 second periods are provided to store data at a frame rate of one frame per second. One skilled in the art will appreciate that in the timeline of this example, two of the 8 second periods are of different sizes with respect to memory capacity, i.e. greater number of bins, than the other two 8 second periods. This is consistent with the higher frame rate used in two of the 8 second periods.

One skilled in the art will also appreciate the great latitude available for managing a memory buffer of limited capacity to expand a timeline. One skilled in the art will further appreciates that where memory buffers deploy FIFO or 'round-robin' strategies for overwrite operations, very important data may be lost. FIFO and 'round-robin' strategies discriminate against the oldest data in a memory buffer, and in situations where the oldest data is not the least valuable, FIFO and round-robin systems are inferior to the system of the present invention.

Figure 9:
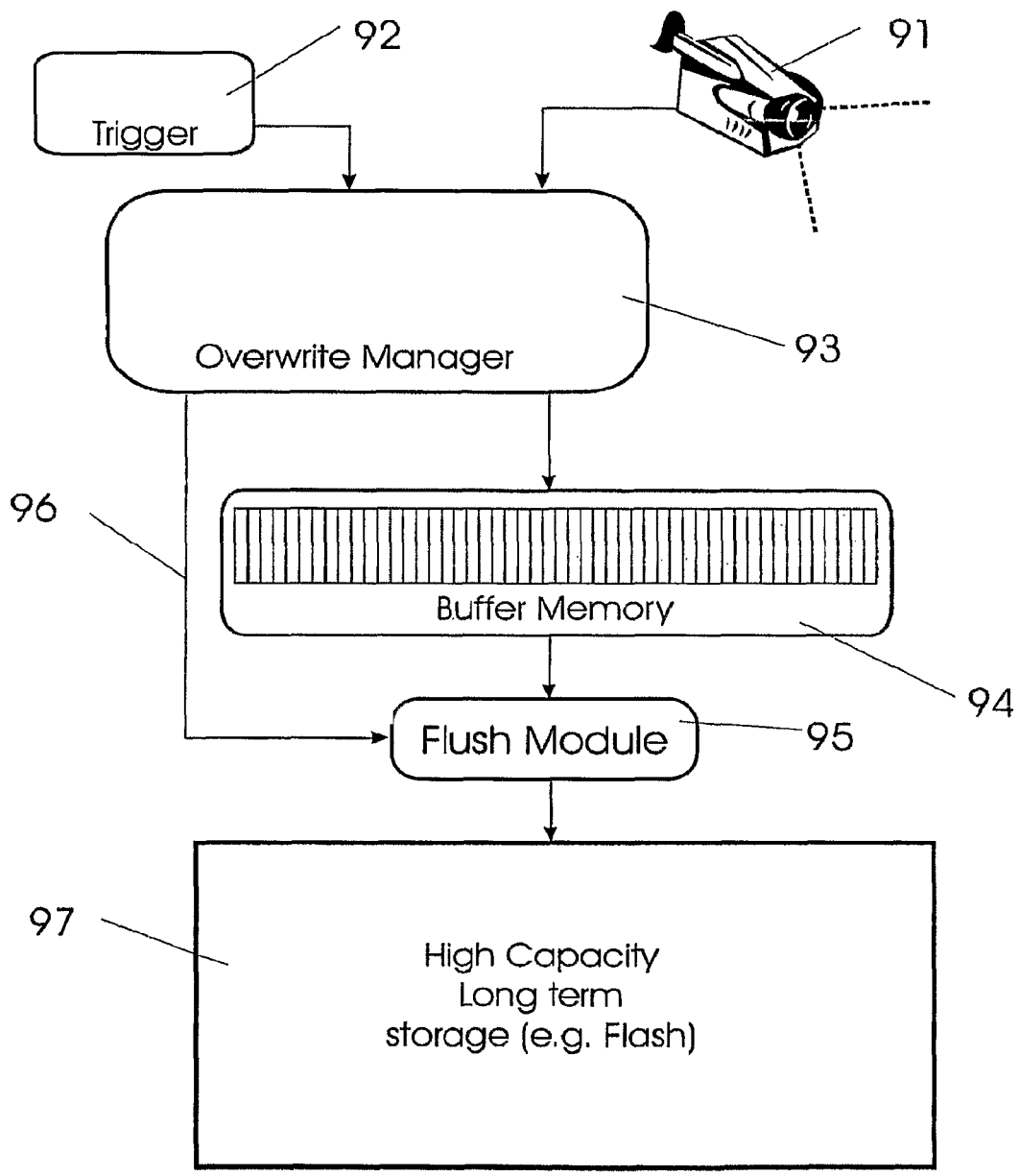
FIG. 9 is a block diagram of one embodiment of the invention.

Referring now to FIG. 9, the fundamental elements of apparatus according to the present invention is described. Video camera 91 is operable for collecting optical energy and for converting the image of a scene into electrical signals, suitable for processing by common electronic means such as digital semiconductor memories and processors. In addition, these systems include a trigger mechanism 92.

In one embodiment, a trigger mechanism is the device arranged to provide an electrical signal that indo indicates that a particular video series should be transferred to permanent memory for long-term storage. A trigger may be an accelerometer operable for detecting abrupt changes in speed, for example, speed changes related to a traffic accident. Triggers may be activated by other events such as heavy braking or swerving maneuvers, and may be activated by means other than accelerometers. For example, a user panic button can be used to activate a trigger event.

When the user believes that a video series should be saved, he can hit a panic button to activate one type of trigger. It is not relevant what precisely causes a trigger to be activated, but rather how memory performs once a trigger event has occurred. Overwrite manager 93 is a control module that interfaces with the trigger and a video camera, and also with a buffer memory 94. An overwrite manager includes means where a timeline definition may be set and further means for executing overwrite operations in agreement with the stored timeline definitions. Further, an overwrite manager may additionally integrate with flush-module 95.

When a trigger event occurs, overwrite manager 93 continues to overwrite data to buffer memory 94 in accordance with the timeline definition, by way of an overwrite pointer which is associated with a cell subject to an impending overwrite action. Overwrite manager 93 sends a signal 96 to flush module 95 that cause flush module 95 to copy buffer memory 94 and to transfer the video data set with the prescribed expanded timeline to high-capacity long-term storage 97. Overwrite manager 93 controls the algorithms and the necessary processing components for writing to buffer memory 94 and save selected data while purging redundant data in accordance with a particular expanded timeline definition.

Figure 10:
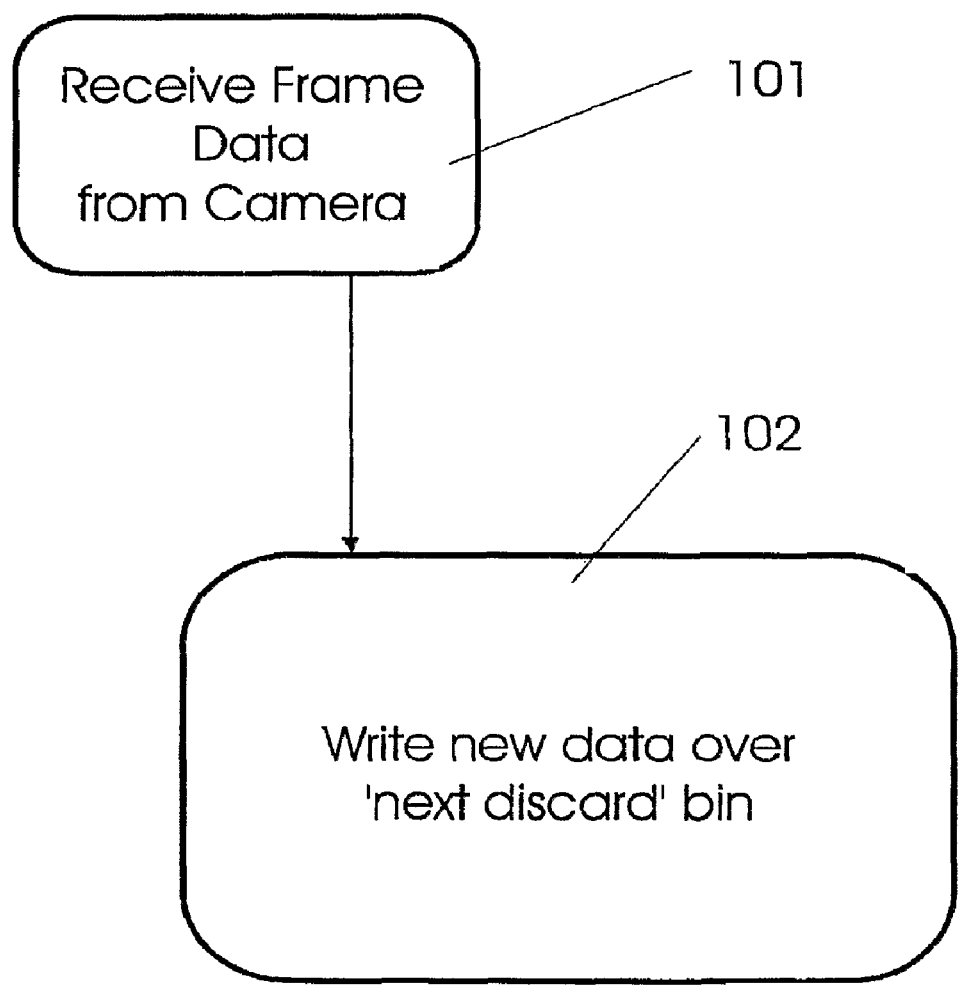
FIG. 10 is a block diagram representing an embodiment of a methods for memory management.
Figure 11:
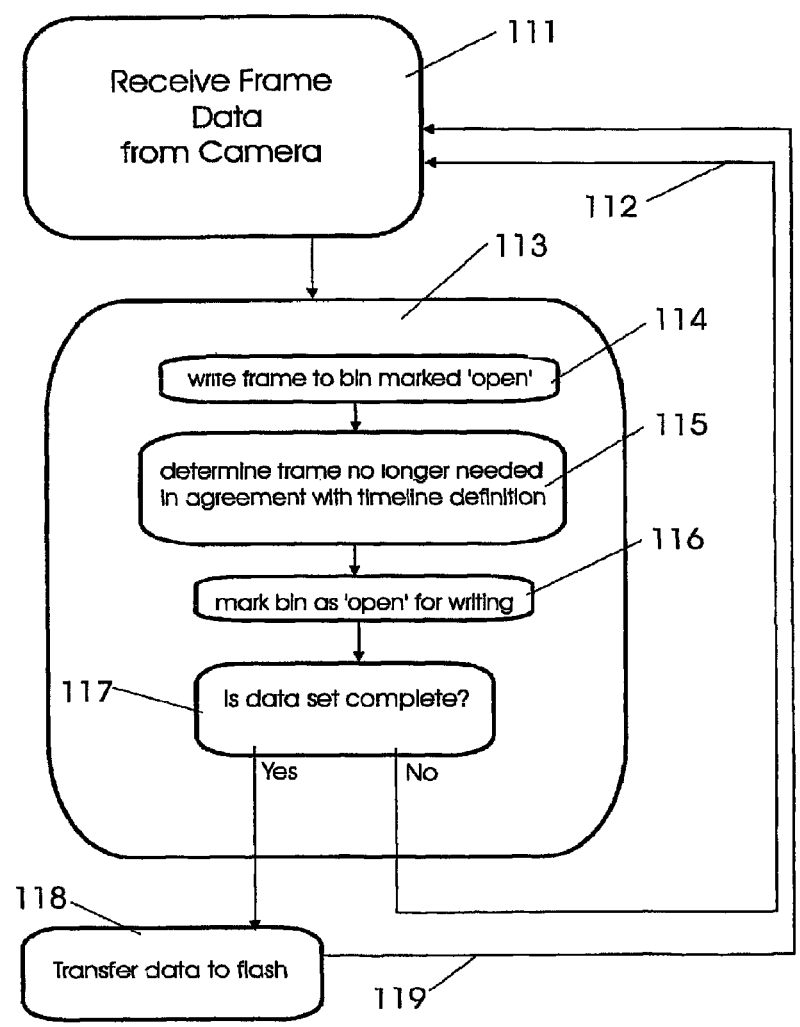
FIG. 11 is a more detailed block diagram of the method of FIG. 10.

FIGS. 10 and 11 which illustrate the primary steps of methods in accordance with the present invention. In particular, FIG. 10 describe such methods in the most general sense to include step 101, whereby frame data is received from a video camera, and step 102, whereby the newly received data is written over old data stored in the memory buffer according to an expanded timeline definition.

FIG. 11 illustrates these methods in greater detail. Frame data 111 is received from a video camera in a first step. Buffer memory data write step 113 includes sub-step 114, in which the frame is written to a bin marked open. It is important that data be written in the buffer memory in an organized fashion, without disturbing particular data frames, necessary to fill the prescribed expanded timeline definition. Therefore, a bin is marked 'open' when it no longer contains frame data necessary for the expanded timeline definition.

In second sub-step 115, a determination is made as to which memory bin contains frame data that is no longer needed in agreement with the timeline definition. This determination made during each cycle. For every new frame entering the buffer memory, another frame becomes no longer necessary at the same instant.

Finally, in third sub-step 116, the bin which contained data that is no longer required is marked 'open'. In following cycle 112, the next incoming frame is written to the appropriate bin. It is helpful to set a buffer memory pointer to direct the incoming frame to a bin marked 'open'.

One skilled in the art will appreciate that advanced memory management schemes may be deployed to expand a recorded timeline in memory buffers having limited capacity.

While embodiments of the invention have been described above, it will be apparent to one skilled in the art that various changes and modifications may be made. The appended claims are intended to cover all such changes and modifications that fall within the true spirit and scope of the invention.

What is claimed is:

1. A vehicle event recorder configured to be mounted in a vehicle, the vehicle event recorder comprising:
a video camera having a field-of-view that includes an environment about the vehicle, the video camera configured to acquire consecutive frames of visual information representing the environment about the vehicle;
a buffer memory configured to electronically store information;
one or more sensors configured to generate output signals conveying information related to vehicle events; and
a controller configured to:
effectuate storage of the consecutive frames of visual information in the buffer memory with a first frame storage density;
detect vehicle events based on the output signals; and
responsive to detecting a vehicle event, designate individual frames of visual information stored in the buffer memory related to the vehicle event for long-term storage,
wherein the individual frames related to the vehicle event designated for long-term storage have the first frame storage density during a first period of time that includes the vehicle event,
wherein the individual frames related to the vehicle event identified for long-term storage have a second frame storage density for a second period of time before the first period of time and a third period of time after the first period of time,
wherein the first frame storage density is higher than the second frame storage density, and
wherein the controller is configured to facilitate interleaved overwriting of frames in the buffer memory not related to the vehicle event and not designated for long-term storage with additional frames acquired by the video camera after detection of the vehicle event, and wherein at least one of the additional frames acquired by the video camera after detection of the vehicle event is designated for long-term storage.

2. The vehicle event recorder of claim 1, wherein the controller is configured such that the individual frames designated for long-term storage have a variable frame storage density that corresponds to an amount of time from the vehicle event on a vehicle event timeline such that the individual frames designated for long-term storage are more dense nearer in time to the vehicle event and less dense farther in time from the vehicle event.

3. The vehicle event recorder of claim 1, wherein the controller is configured such that the first frame storage density and the second frame storage density are related to a number of frames stored per a number of consecutive frames acquired by the video camera.

4. The vehicle event recorder of claim 1, wherein the controller is configured such that the first period of time, the second period of time and the third period of time are the same.

5. The vehicle event recorder of claim 1, wherein the controller is configured such that the second period of time and the third period of time are different.

6. The vehicle event recorder of claim 1, wherein the controller is configured such that individual frames designated for long-term storage during the third period of time have a third frame storage density that is different than the first frame storage density and the second frame storage density.

7. The vehicle event recorder of claim 1, wherein the one or more sensors include an accelerometer.

8. The vehicle event recorder of claim 1, further comprising a long-term memory configured to electronically store information, wherein the controller is configured to facilitate transferring the individual frames designated for long-term storage from the buffer memory to the long-term memory.

9. The vehicle event recorder of claim 8, wherein the controller is configured to facilitate transfer of the individual frames designated for long-term storage responsive to the buffer memory being filled to capacity with frames designated for long-term storage.

10. The vehicle event recorder of claim 8, wherein, responsive to the transfer, the controller resets the buffer memory to an initial state wherein no individual frames are designated for long-term storage.

11. The vehicle event recorder of claim 8, wherein the long-term memory is configured to store individual frames related to a plurality of vehicle events.

12. A method for storing visual information related to a detected vehicle event, the method comprising:
acquiring consecutive frames of visual information representing the environment about a vehicle with a video camera having a field-of-view that includes an environment about the vehicle;
effectuating storage of the consecutive frames of visual information in a buffer memory with a first frame storage density;
generating output signals conveying information related to vehicle events;
detecting vehicle events based on the output signals; and responsive to detecting a vehicle event, designating individual frames of visual information stored in the buffer memory related to the vehicle event for long-term storage,
- wherein the individual frames related to the vehicle event designated for long-term storage have the first frame storage density during a first period of time that includes the vehicle event,
- wherein the individual frames related to the vehicle event identified for long-term storage have a second frame storage density for a second period of time before the first period of time and a third period of time after the first period of time, and
- wherein the first frame storage density is higher than the second frame storage density, and facilitating interleaved overwriting of frames in the buffer memory not related to the vehicle event and not designated for long-term storage with additional frames acquired by the video camera after detection of the vehicle event, and wherein at least one of the additional frames acquired by the video camera after detection of the vehicle event is designated for long-term storage.

\* \* \* \* \*